United States Patent
Kobayashi

[19]

[11] Patent Number: 6,001,403
[45] Date of Patent: Dec. 14, 1999

[54] METHOD AND APPARATUS FOR PRODUCING A CORED FOOD IN BAR SHAPE

[75] Inventor: Masao Kobayashi, Fukui, Japan

[73] Assignee: Kobird Co., Ltd., Fukui, Japan

[21] Appl. No.: 09/091,705

[22] PCT Filed: Nov. 20, 1997

[86] PCT No.: PCT/JP97/04231

§ 371 Date: Jun. 23, 1998

§ 102(e) Date: Jun. 23, 1998

[87] PCT Pub. No.: WO98/25480

PCT Pub. Date: Jun. 18, 1998

[30] Foreign Application Priority Data

Dec. 12, 1996 [JP] Japan ................................. 8-331815

[51] Int. Cl.⁶ ...................................................... A23P 1/10
[52] U.S. Cl. .......................... 426/297; 426/512; 426/514; 426/517; 99/450.6; 99/450.7; 425/335; 425/363; 425/505
[58] Field of Search .................................. 426/297, 503, 426/512, 514, 517; 99/450.6, 450.7, 485; 425/327, 335, 363, 505

[56] References Cited

U.S. PATENT DOCUMENTS

| | | | |
|---|---|---|---|
| 2,960,045 | 11/1960 | Pentzlin | 426/284 |
| 4,799,875 | 1/1989 | Thompson | 426/512 X |
| 5,395,229 | 3/1995 | Atwood | 426/514 X |
| 5,540,578 | 7/1996 | Atwood | 425/364 B |
| 5,664,486 | 9/1997 | Atwood | 425/364 B |
| 5,759,605 | 6/1998 | Atwood | 426/512 X |

FOREIGN PATENT DOCUMENTS 8906356 11/1989 Germany.

*Primary Examiner*—Milton Cano
*Attorney, Agent, or Firm*—Snider & Associates; Ronald R. Snider

[57] ABSTRACT

An apparatus and method for continuously producing a cored food in a bar shape by molding a round outer skin material (2) in a space-saving manner provides a method whereby the outer skin material (2) and an inner material (1) are mounted in this order on a carriage conveyor (3). A belt portion comprises a number of belt pieces (31) arranged in the carriage course of the conveyor (3) so that they are foldable towards said conveyor independently from each other. Both end portions (31a) of each belt piece (31) are raised by a pair of guides (4) so as to bend the outer skin material (2) into a gutter-like shape. The outer skin material (2) bent in this way is further compressed with compression molding members (5) through the belt pieces (31). The inner material (1) surrounded with the outer skin material (2) is continuously produced and forms a cored food (F) in a bar shape.

23 Claims, 10 Drawing Sheets

METHOD AND APPARATUS FOR PRODUCING A CORED FOOD IN BAR SHAPE

BACKGROUND OF THE INVENTION

1. Field of the Invention

The present invention relates to a method of producing a cored food in bar shape and an apparatus used in the same. More specifically, it relates to a method and apparatus capable of continuously producing a cored food in bar shape formed by covering an inner material with an outer skin material.

2. Prior Art

The conventional method of mechanically producing a cored food in bar shape in which an inner material such as sweet smashed bean paste is covered with an outer skin material such as a flat and sticky pounded rice cake is generally well-known. The two types of food materials are each continuously extruded for molding into a bar shape from a telescopic nozzle consisting of a large nozzle and a small one.

However, the conventional method mentioned above, in which the food materials are forcibly extruded from the nozzles by means of a screw pump, a vane pump and the like, weakens the stickiness inherent in glutinous substances such as those contained in bread dough and affects the quality of the food materials. In addition, the granularity of steamed glutinous or nonglutinous rice extruded for molding is affected.

In another conventional method of producing a cored food in bar shape, an inner material is covered with a flatly extended outer skin material mounted on the belt conveyor by gradually rounding both sides of the conveyor belt portion into a tube-like shape along a pair of guides.

However, since the latter conventional method mentioned above requires an extra belt transformation space long enough to transform both fringe sides of the conveyor belt portion from its original flat shape into a tube-like shape, the apparatus as a whole can not help becoming large-scale in size.

SUMMARY OF THE INVENTION

Thus, the present invention provides a method of continuously producing a cored food in bar shape by spherically molding a flatly extended outer skin material in a space-saving manner and an apparatus used in the same method.

Also, the present invention provides a method of continuously producing a cored food in bar shape, without affecting the quality of a food material by damaging its glutinous substance or smashing its granularity, as well as an apparatus used in the same method.

In order to solve the above-mentioned inconveniences encountered with the prior art, the present invention adopts a method of producing a cored food in a bar shape made of at least two types of food materials and formed by covering an inner material with an outer skin material comprising the steps of: mounting the outer skin material extended in a flat shape on a carriage conveyor, whose belt portion comprises a number of belt pieces aligned in the moving direction of the conveyor, in such a manner that they are foldable towards the conveyor independently from each other; placing said inner material upon said outer skin material; bending said skin material mounted on said belt pieces into a gutter-like shape by raising both ends of each belt piece in operation along a pair of guides provided on both sides of the conveyor; and intermittently compressing the outer skin material bent into a gutter-like shape via the belt pieces with at least a pair of compression molding members, each provided on both sides of the conveyor in such a manner that said molding members swing back and forth with respect to the conveyor, thereby covering said inner material with the outer skin material so as to continuously produce a cored food in a bar shape.

Also, in order to overcome the aforesaid inconveniences encountered with the prior art, the present invention also adopts an apparatus of producing a cored food in a bar shape made of at least two types of food materials and formed by covering an inner material with an outer skin material comprising: a carriage conveyor, whose belt portion comprises a number of belt pieces aligned in the moving direction of the conveyor in such a manner that they are foldable towards the conveyor independently from each other, a pair of guides provided on both sides of the conveyor, which raise both ends of each belt piece in operation so as to bend said belt pieces into a gutter-like shape, and at least a pair of compression molding members, each provided on both sides of the conveyor, which swing back and forth with respect to the conveyor wherein while the outer skin and the inner material mounted on the outer skin are carried by the conveyor, said outer skin is bent into a gutter-like shape by raising both ends of each belt piece along a pair of guides and intermittently compressed via the belt pieces with the compression molding members, thereby covering said inner material with the outer skin material so as to continuously produce a cored food in a bar shape.

The method of producing a cored food in a bar shape and the apparatus used in the same embodied in the present invention is extremely useful for producing a bread dough whose glutinous substance is not damaged at all as well as a steamed rice food with its granularity intact.

DESCRIPTION OF THE PREFERRED EMBODIMENT

Hereinafter, the present invention is in more detail described on the basis of the accompanying drawings.

Figure 1:
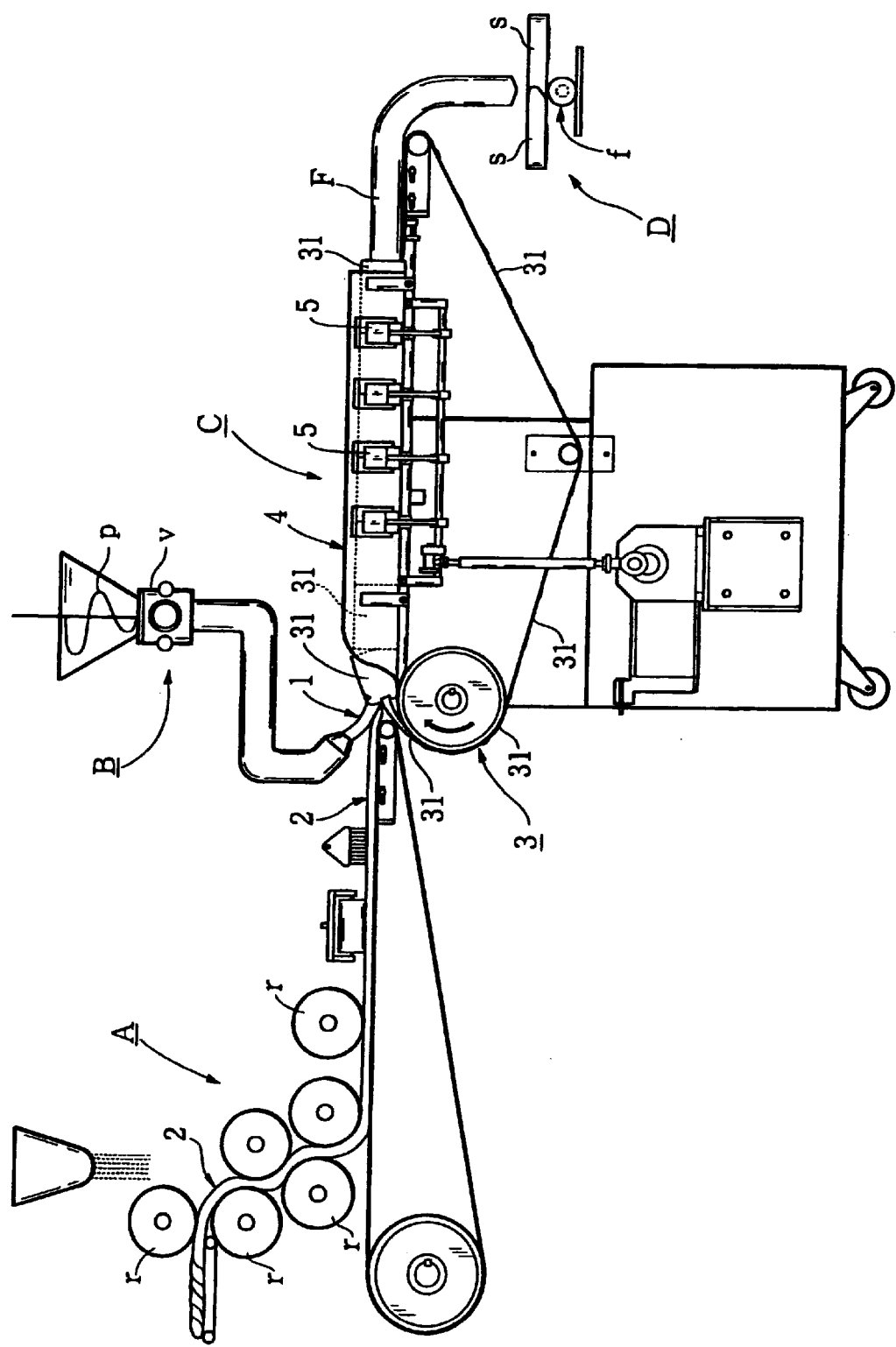
FIG. 1 is a schematic side elevation view of the apparatus embodied in the present invention in practical use.

What is indicated with (C) in FIG. 1 is the apparatus of producing a cored food in a bar shape embodied in the present invention. The apparatus continuously produces a cored food (F) in round and bar shape an outer skin material (2) (e.g., bread dough) flatly extended by an outer skin molder (A) provided with plural rollers (r)•(r)•• and a bar-shaped inner food material (1) (e.g., sweet smashed bean paste) pushed out by an extruder (B) provided with a screw pump (p) and a vane pump (v), and then a cutting device (D) (e.g., such as disclosed in the Japanese Patent Application Laid-Open No. 7-111884 filed by the present applicant) provided with plural shutters (s)•(s)•• shears off this continuous cored food (F) molded in round and bar shape by a certain length thereby efficiently producing a lump food (f) (such as a bun stuffed with sweet smashed bean paste).

Figure 2:
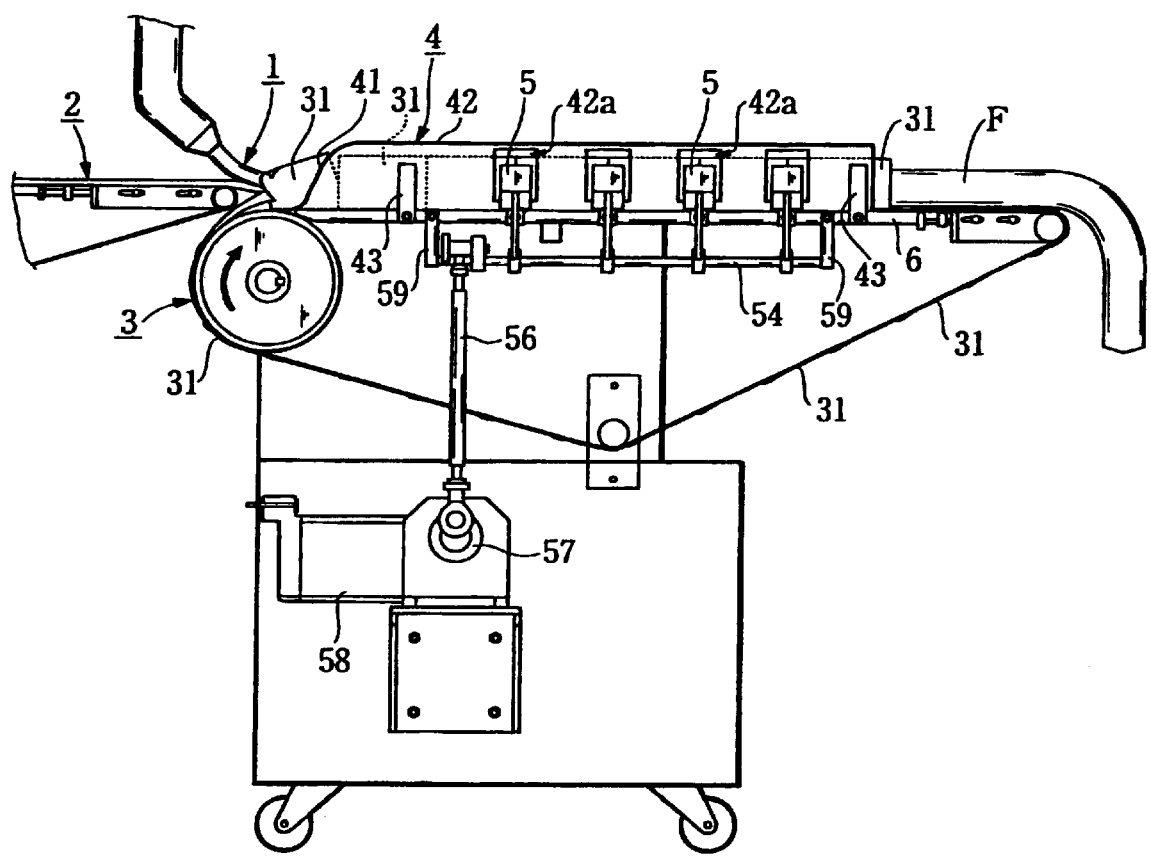
FIG. 2 is a whole side elevation view of the apparatus embodied in the present invention.

The apparatus embodied in the present invention, as shown in FIG. 2, comprises a carriage conveyor (3) for carrying a flatly extended outer skin material (2) and a bar-shaped inner material (1), a pair of guides (4) and (4) provided on both sides of the conveyor (3) and eight compression molding members (5) provided four by four on both sides of the conveyor (3) in such a manner that one molding member (5) at one side opposedly faces the corresponding member (5) at the other side so as to make four pairs of them on the conveyor (3). Hereafter, each structural member of the apparatus is described in more detail.

Figure 3:
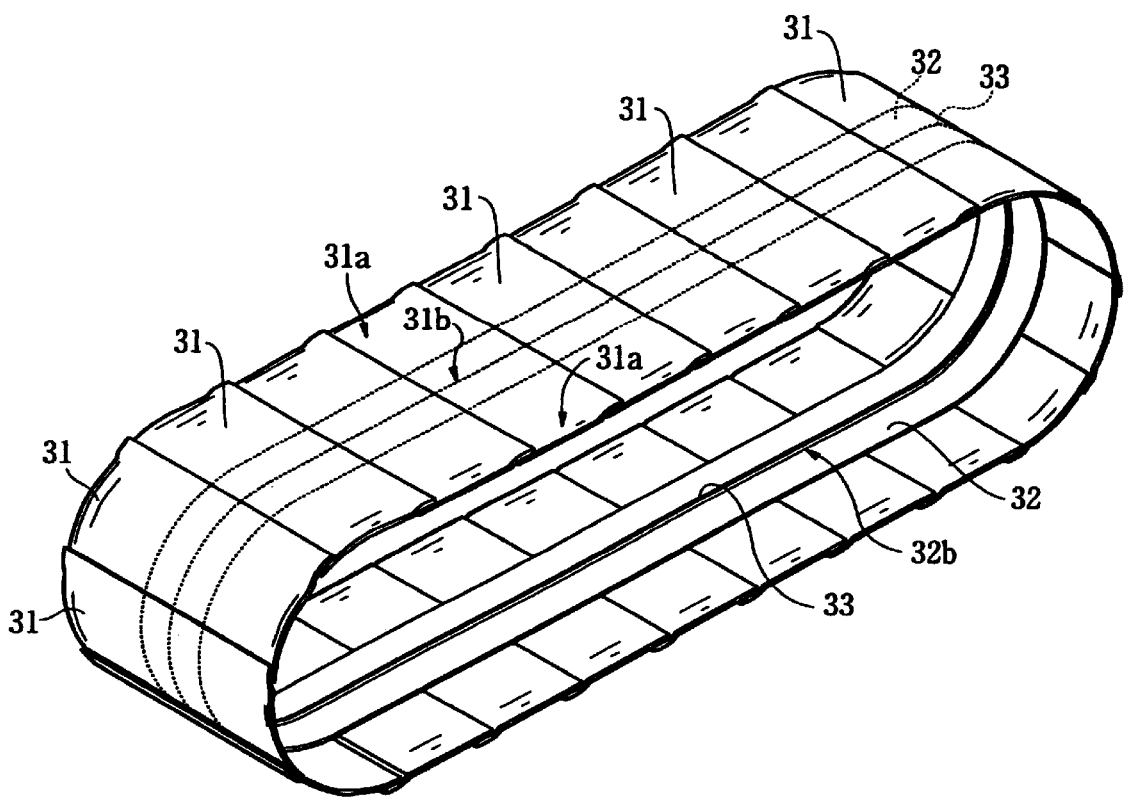
FIG. 3 is a partial perspective view of the conveyor belt portion of the apparatus embodied in the present invention.

With the carriage conveyor (3) embodied in the present invention, as shown in FIG. 3, the belt portion thereof comprises a number of belt pieces(31)•(31)•• aligned in the moving direction of the conveyor (3) in such a manner that they are foldable towards the conveyor (3) independently from each other. This belt portion is arranged in such a manner that a first belt piece (31) partly overlaps a second belt piece (31) adjacently located on the downstream side of the moving direction of the conveyor (3). Those belt pieces (31) are each lined on the central region (31b) thereof with the central portion (32b) of a lining belt (32) and a V belt (33) is attached on the backside of this lining belt (32). In this case, instead of the lining belt (32) on the backside of which the V belt is attached, a timing belt can be substituted.

Figure 4:
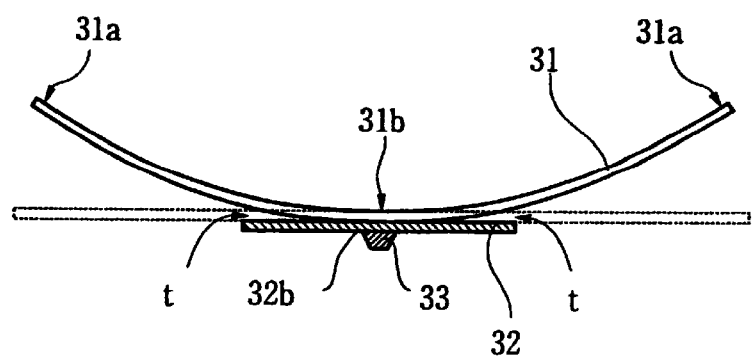
FIG. 4 is a transverse sectional view of the conveyor belt portion of the apparatus embodied in the present invention.

For such a structure as mentioned above, with the conveyor (3) embodied in the present invention, as shown in FIG. 4, it becomes possible to raise both ends (31a) and (31a) of each belt piece (31) by folding said piece (31) independently from other adjacent belt pieces. When both ends of said belt piece (31) have been raised, gaps (t) arise between the backside of each belt piece (31) and a lining belt (32).

Figure 5:
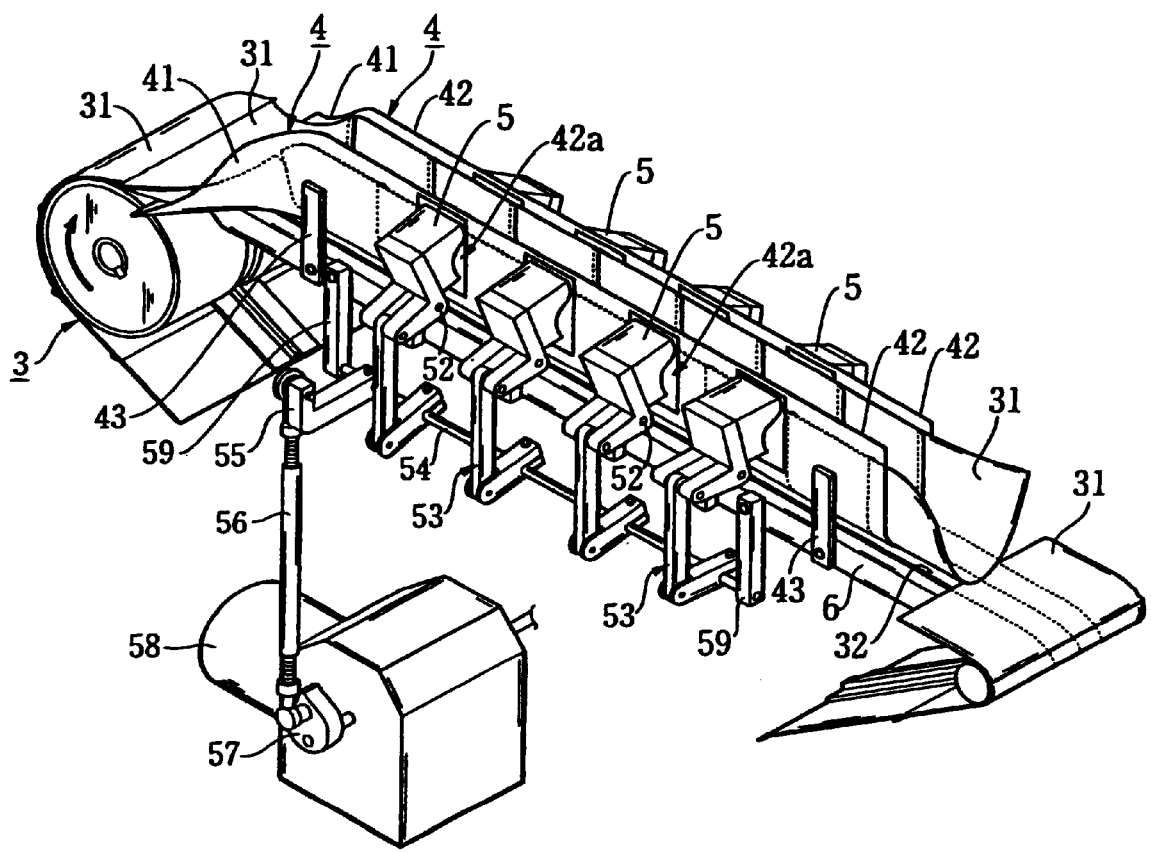
FIG. 5 is a perspective view of the compression molding members of the apparatus embodied in the present invention.
Figure 6:
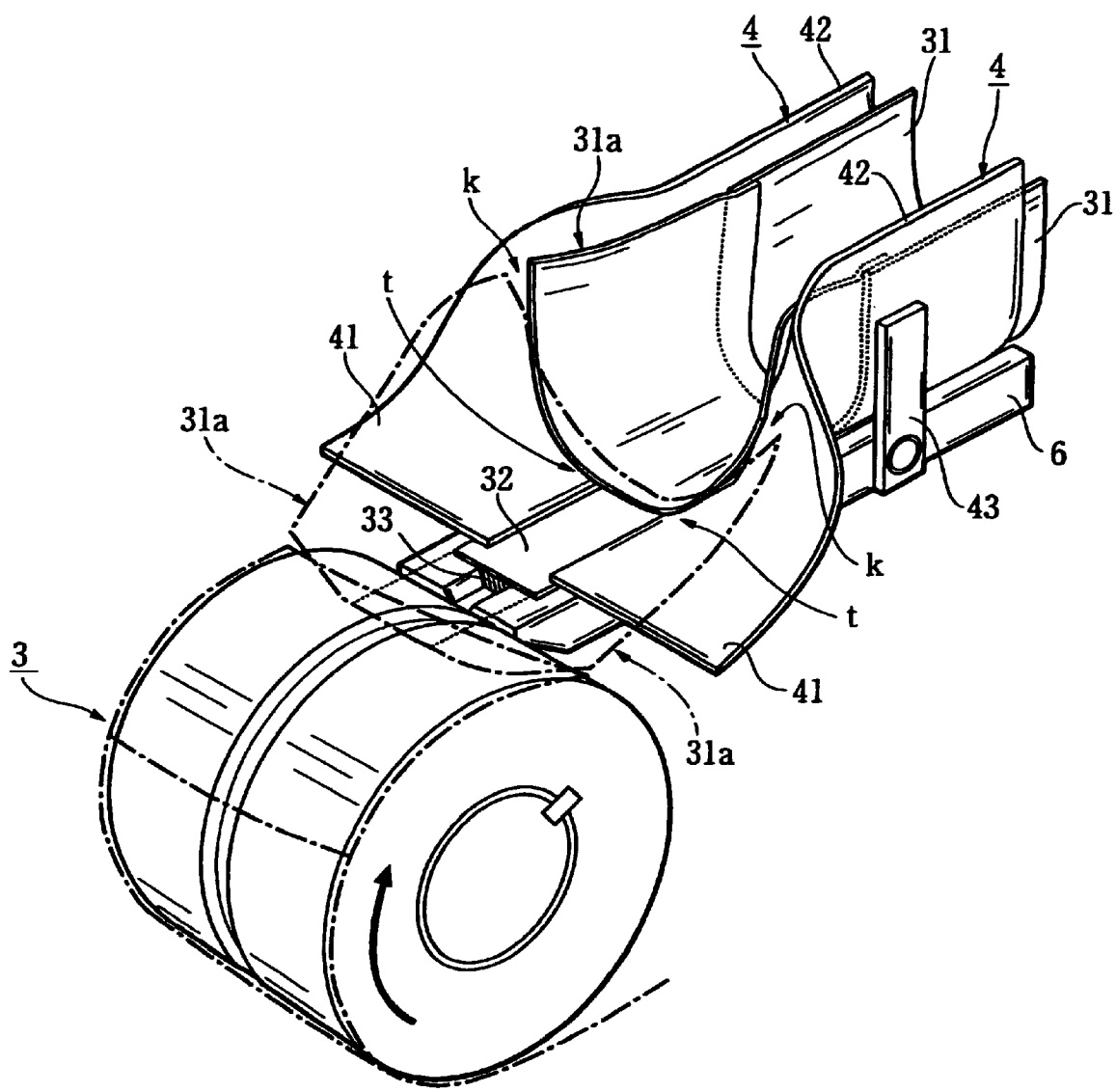
FIG. 6 is a partial perspective view showing the funneled end portions of the guides of the apparatus embodied in the present invention.

A pair of guides (4) and (4) embodied in the present invention, as shown in FIGS. 5 and 6, are opposedly fixed on a frame (6) provided along the inner side of the conveyor (3) via support pieces (43). The end portions (41) and (41) of the guides (4) and (4) are formed in a funneled shape in such a manner that the inclination of the guides gradually increases as they shift from the lie-down state to the upright state while the main body portions (42) and (42) of the guides (4) and (4) are each formed in a "J" shape seen from their transverse section, and four openings (42a) are provided on each of said portions (42) so as to make four pairs of openings (42a) into and out of which the compression molding members (5) as mentioned below move.

For such a structure as mentioned above, the guides (4) and (4), as shown in FIG. 6, raise both ends (31a) and (31a) of each belt piece (31) in operation along the funneled end portions (41) and (41). Then, each belt piece (31) raised this way is kept bent by the main body portions (42) and (42) in a gutterlike shape.

In the present embodiment, as shown in FIG. 6, both ends (31a) and (31a) of a belt piece (31) are raised with said funneled end portions (41) and (41) in such a manner that the lower fringes of the end portions (41) and (41) are inserted into the aforesaid gaps (t) (refer to FIG. 4) between each belt piece (31) and a lining belt (32) while said end portions (41) and (41) superpose both sides of the lining belt (32).

For this reason, there is no case where the lining belt (32) and the V belt (33) are raised together with both ends (31a) and (31a) of the belt piece (31) by the funneled end portions (41) and (41) even though they are raised quickly, so that it makes it possible to securely bend the belt pieces (31) into a gutter-like shape while it can prevent the conveyor (3) from idling. It should be noted that a belt piece (31) located on the most upstream of the conveyor (3) is defined with a broken line in order to demonstrate the gaps (t) in the drawing.

Furthermore, in the present embodiment, as mentioned above, the conveyor belt portion comprises belt pieces (31) arranged in the moving direction of the conveyor in such a manner that a first belt piece (31) partly overlaps a second adjacent belt piece (31) so that gaps (k) (refer to FIG. 6) generated between a rising belt piece (31) and the adjacent belt piece (31) can be narrowed to the extent that they do not interrupt the outer skin material (2) from being bent into a gutter-like shape. Without such contrivance to narrow said gaps (k), the outer skin material (2) may be clogged into those gaps (k) according to the type of the outer skin material (2) so that there occur some cases where the belt pieces cannot be properly bent into a gutter-like shape. The extent of the gap (k) depends on such factors as the funneled shape of the end portions (41) of the guides and the largeness of the overlapped space between two adjacent belt pieces. If this overlapped space is further enlarged, those gaps (k) may be dispensed with.

The compression molding members(5)•(5)•, as shown in FIG. 5, are disposed in such a manner that four of them directly face as many openings (42a) provided on each of the aforesaid guides (4) and (4), said members (5) being pivotally mounted on said frame (6) by way of pivotal axes (52) so as to swing back and forth with regard to the conveyor (3). On the upper part of the compression molding members (5) respectively, a compression surface (51) (refer to FIG. 10) fittable to the shape of the outer skin material (2) to be compressed for molding is provided.

While those compression molding members (5) are each structured in the form of a bell crank, a parallel crank mechanism (53) is arranged between each compression molding member (5) and a common revolving shaft (54) pivotally connected on the frame (6) by way of pivotal members (59). With this mechanism, the driving force of a motor (58) is transmitted to said common revolving shaft (54) via a crank (57), a connecting rod (56) and a lever (55) so that said shaft (54) revolves within a certain range of angle. Then, the revolving force of this shaft (54) is further transmitted to each compression molding member (5) through each parallel crank mechanism (53) so that each pair of the compression members (5) synchronously swings back and forth.

It should be noted that because said common revolving shaft (54) and each parallel crank mechanism (53) are fixed with screws, it makes the fixing angle of each parallel crank mechanism (53) with regard to the common revolving shaft (54) adjustable so that the swinging angle of each pair of the compression molding members (5) can be easily adjusted. Thus, for instance, it enables the outer skin material (2) to be compressed in stages from the upstream side of the conveyor to the downstream side thereof by varying the swinging angle of each pair of the compression molding members (5). The driving mechanism for the counterpart compression molding members (5) is not shown in FIG. 5, but they are also driven by the motor (58) in the same way as shown in the drawing.

Then, with reference to FIGS. 7 to 13, the steps of continuously producing a cored food (F) in round and bar shape by means of the apparatus embodied in the present invention are more specifically described below.

Figure 7:
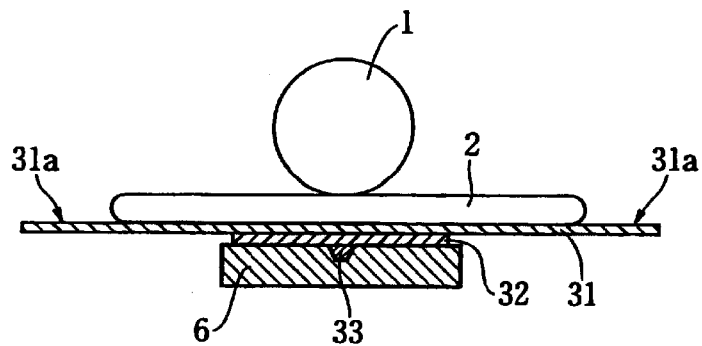
FIGS. 7 to 13 are partly sectional views showing the steps of producing a cored food in a bar shape by means of the apparatus embodied in the present invention.
Figure 8:
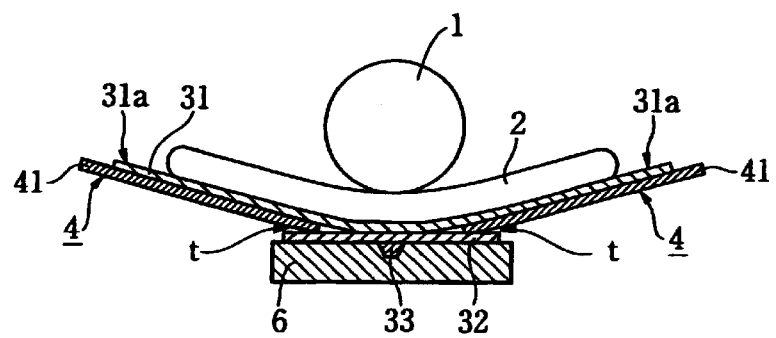
Figure 9:
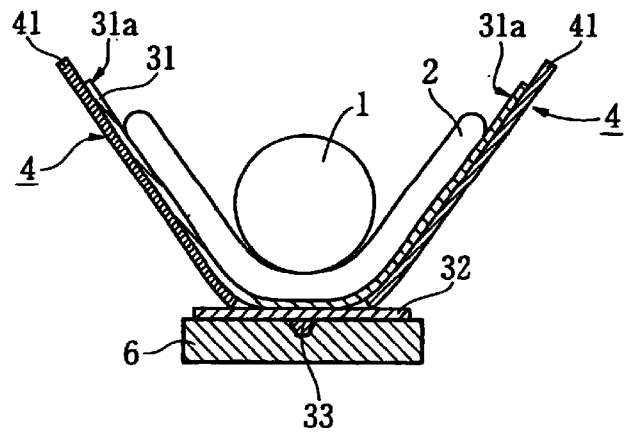

Firstly, as shown in FIG. 7, an outer skin material (2) (bread dough) preliminarily extended in flat shape by the aforesaid outer skin molder (A) (refer to FIG. 1) is supplied on the belt pieces (31) in operation, and then a bar-shaped inner material (1) (sweet smashed bean paste) extruded by the extruder (B) (refer to FIG. 1) is mounted on the central region of the outer skin material (2).

When the belt pieces (31) on which the outer skin material (2) and the inner material (2) have been mounted move so as to reach the aforesaid guides (4) and (4), both sides (31a) and (31a) of each belt piece (31) are raised by the funneled end portions (41) and (41) of the guides (4) and (4). By raising both sides (31a) and (31a) of each belt piece (31), the outer skin material (2) is formed into a gutter-like shape in such a manner that the inner material (1) is surrounded with said skin material (2) (refer to FIGS. 8 to 10).

It is worth mentioning that the apparatus embodied in the present invention enables each belt piece (31) to rush into erection by the funneled end portions (41) and (41) of the guides (4) and (4). That is to say, the conveyor belt portion embodied in the present invention comprises a number of belt pieces (31) aligned in the moving direction of the conveyor in such a manner that they can be raised independently from each other. Accordingly, it becomes possible to make an extra space which is necessary to transform the conveyor belt portion performing the bending operation on the outer skin material (2) from the original flat shape (refer to FIG. 7) into the gutter-like shape (refer to FIG. 10) far smaller in comparison to the prior arts. The result is that it can solve the problem of the prior arts once and for all wherein the apparatus of producing a cored food in a bar shape cannot help becoming large-scale in size for the purpose of securing said extra space.

Moreover, in the present embodiment, the gaps (k) (refer to FIG. 6) generated between two adjacent belt pieces (31) are narrowed by partially overlapping one belt piece (31) on the other belt piece (31) so that even though the belt piece (31) is quickly erected, there is no case where the outer skin material (2) is clogged into those gaps (k) so as to interrupt each belt piece (31) from bending in gutterlike shape.

Furthermore, in the present embodiment, as mentioned above, because the funneled end portions (41) superpose both sides of the lining belt (32) by inserting the lower fringes thereof into said gaps (t) (refer to FIGS. 4 and 8), when the outer skin material (2) is bent into a gutter-like shape, neither the lining belt (32) nor the V belt (33) is raised together with the belt piece (31) even though the belt piece (31) is quickly erected, with the result that the outer skin material (2) can be securely bent into a gutter-like shape.

The outer skin material (2) bent into a gutter-like shape this way and the inner material (1) covered with this skin material (2) are carried by the carriage conveyor (3) so as to reach four pairs of the compression molding members (5). At this time, each pair of the compression members (5) repeatedly swinging back and forth with regard to the conveyor (3) intermittently compresses the outer skin material (2) bent into a gutter-like shape through the belt pieces (31) so as to continuously form a cored food (F) in round and bar shape where the inner material (1) is covered with the outer skin material (2) (refer to FIGS. 10 to 12).

Figure 10:
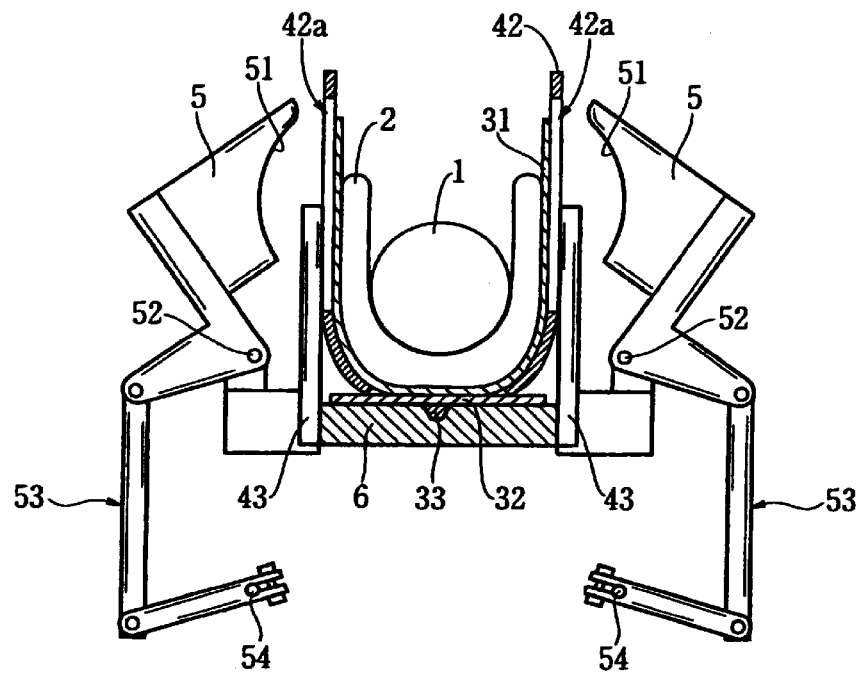
Figure 11:
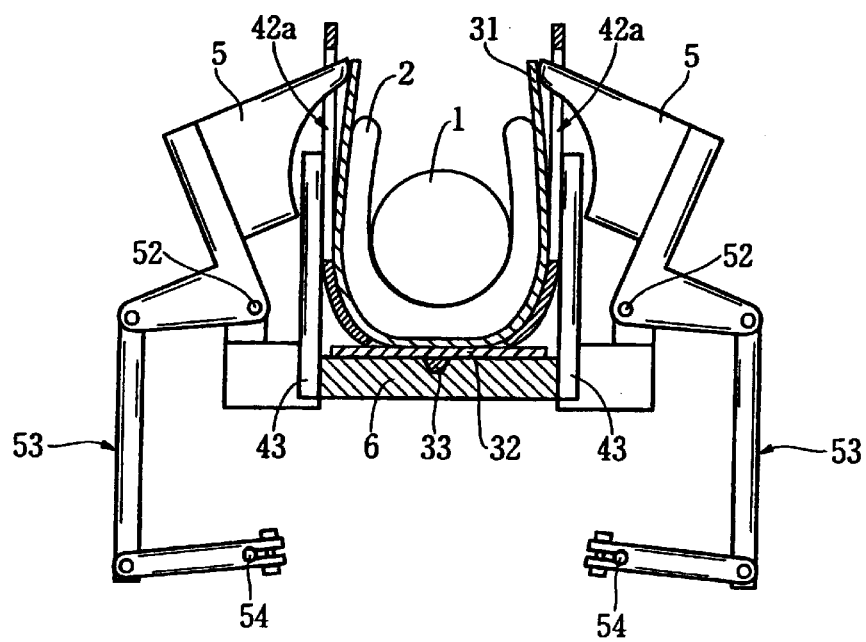
Figure 12:
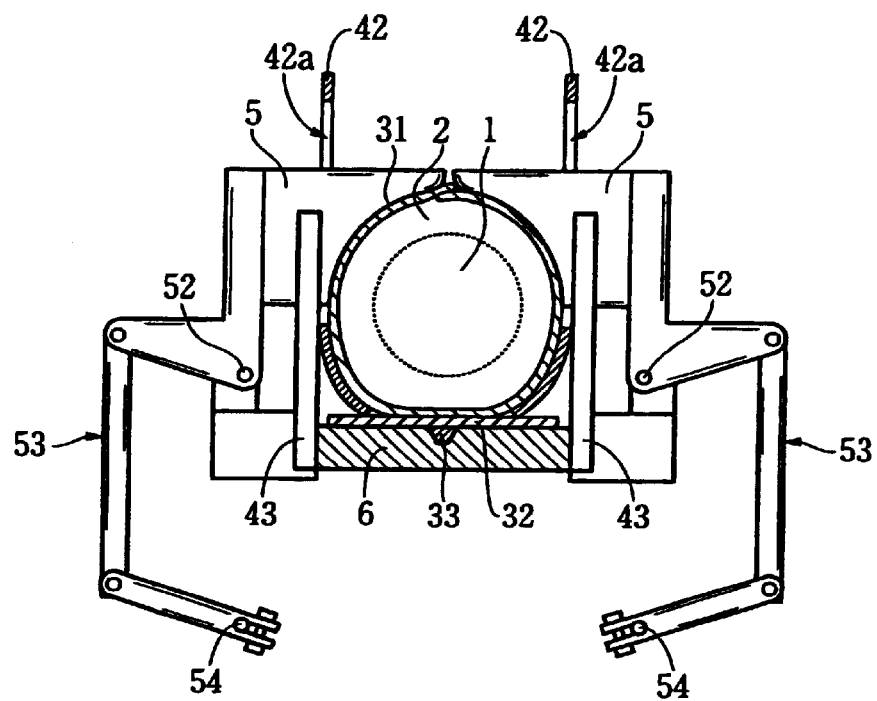
Figure 13:
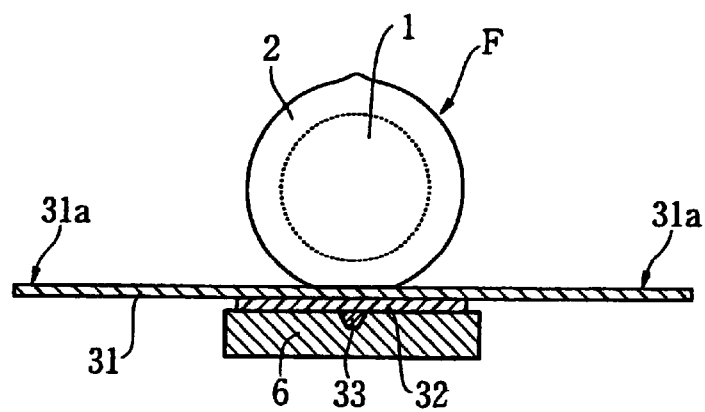

FIGS. 10 to 12 depict the state where a cored food (F) in a bar shape is formed by compressing the outer skin material (2) just once with a pair of the compression molding members (5), but in use, each pair of the compression molding members (5) repeatedly swings back and forth with regard to the carriage conveyor (3) while intermittently compressing the outer skin material (2) as many times as required. Furthermore, when plural pairs of the compression molding members (5) are provided as disclosed in the present embodiment, this enables the outer skin material (2) to be compressed stepwise from the upstream side of the conveyor to the downstream side thereof by varying the swinging angle of each pair of the compression molding members (5) as mentioned above. The compression surfaces (51) of each pair of compression molding members (5) synchronously swinging back and forth with regard to the conveyor can be also varied in shape.

The cored food (F) in a bar shape formed by the compression molding members (5) is further carried with mounted on the belt pieces (31) through the guides (4) or the main body portions (42) and (42) thereof so as to hang down at the end portion of the conveyor (3) (refer to FIG. 1) and reach a cutting device (D) for the cutting operation. The instant that each belt piece (31) has gone through the main body portions (42) and (42), it restores its original plane shape owing to the self-weight and elastic recovery nature and rolls back through a belt pulley (refer to FIG. 5).

In this way, in the present embodiment, the conveyor belt portion comprises a number of belt pieces (31) disposed in the moving direction of the conveyor so that each belt piece (31) quickly restores its original plane shape independently from adjacent belt pieces (31) owing to the self-weight and elastic recovery nature. Accordingly, it becomes possible to make an extra space which is necessary to transform the conveyor belt portion from the gutter-like shape (refer to FIG. 12) into the original flat shape (refer to FIG. 13) far smaller in comparison with the prior arts, with the result that also in this regard the apparatus can be manufactured in a space-saving manner.

The embodiment of the present invention has been substantially described up to here with a concrete example. However, it should be understood that the present invention is not limited to this embodiment, but it can be modified in various manners within the scope of the accompanying patent claims.

Figure 14:
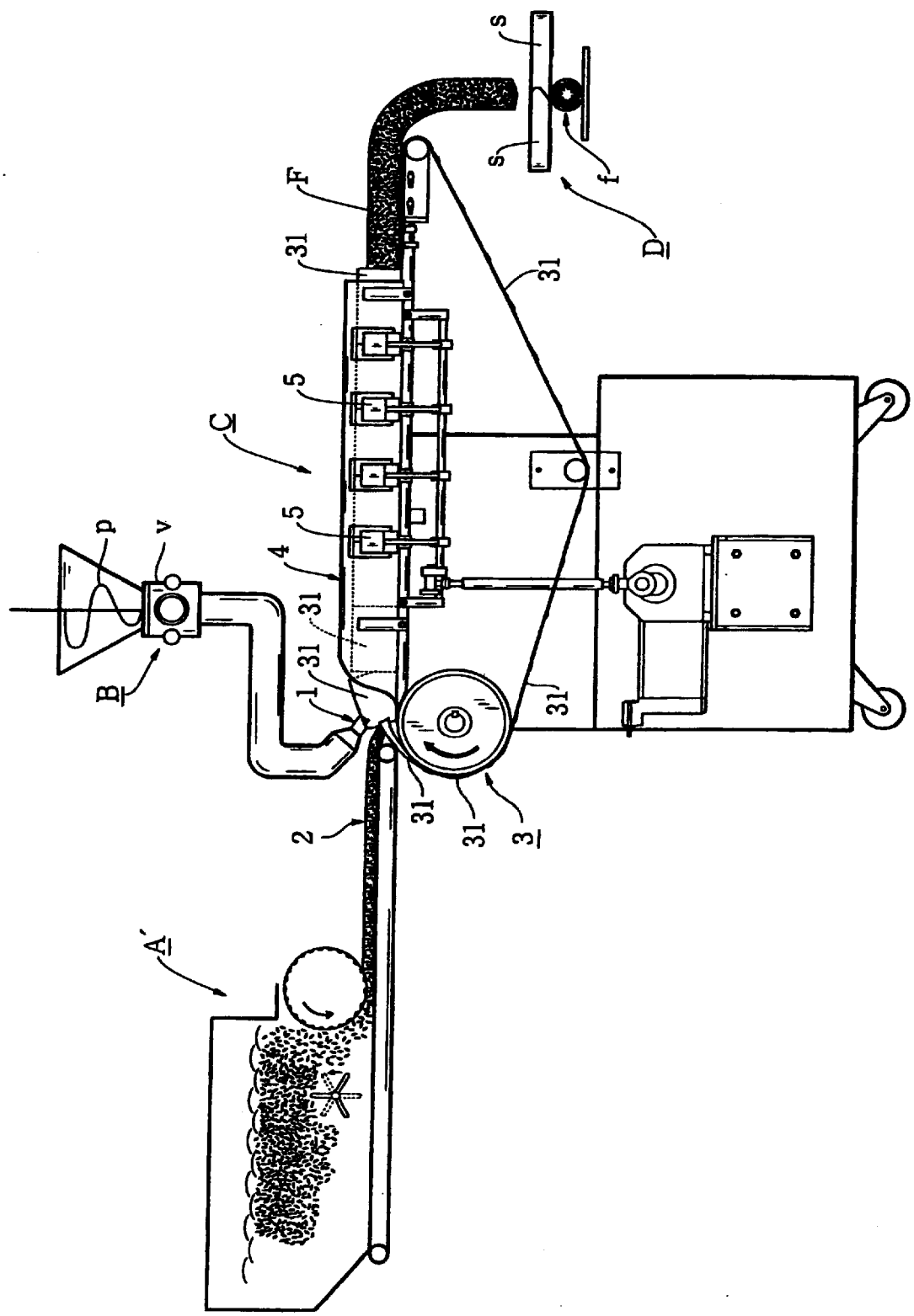
FIG. 14 is a schematic side elevation view of the apparatus embodied in the present invention in another practical use.

For instance, the aforesaid embodiment describes using bread dough as an outer skin material (2), but this material (2) is not necessarily limited to bread dough. If an outer skin molder(A') capable of extending steamed nonglutinous rice in flat shape without affecting its granularity is combined with the apparatus embodied in the present invention as shown in FIG. 14, it becomes possible to form a cored food (F) in a bar shape whose outer skin material (2) is made of nonglutinous rice. That is to say, in the present invention, an outer skin material (2) is molded into a gutter-like shape with the belt pieces (31) and is further intermittently compressed with the compression molding members (5) via the belt pieces (31) so as to continuously form a cored food (F) in a bar shape without either smashing or scattering such steamed rice. According to the present invention, in combination with the cutting device (D), it becomes possible to efficiently produce a food product such as a rice ball (f) while keeping its granularity intact as shown in FIG. 14.

Figure 15:
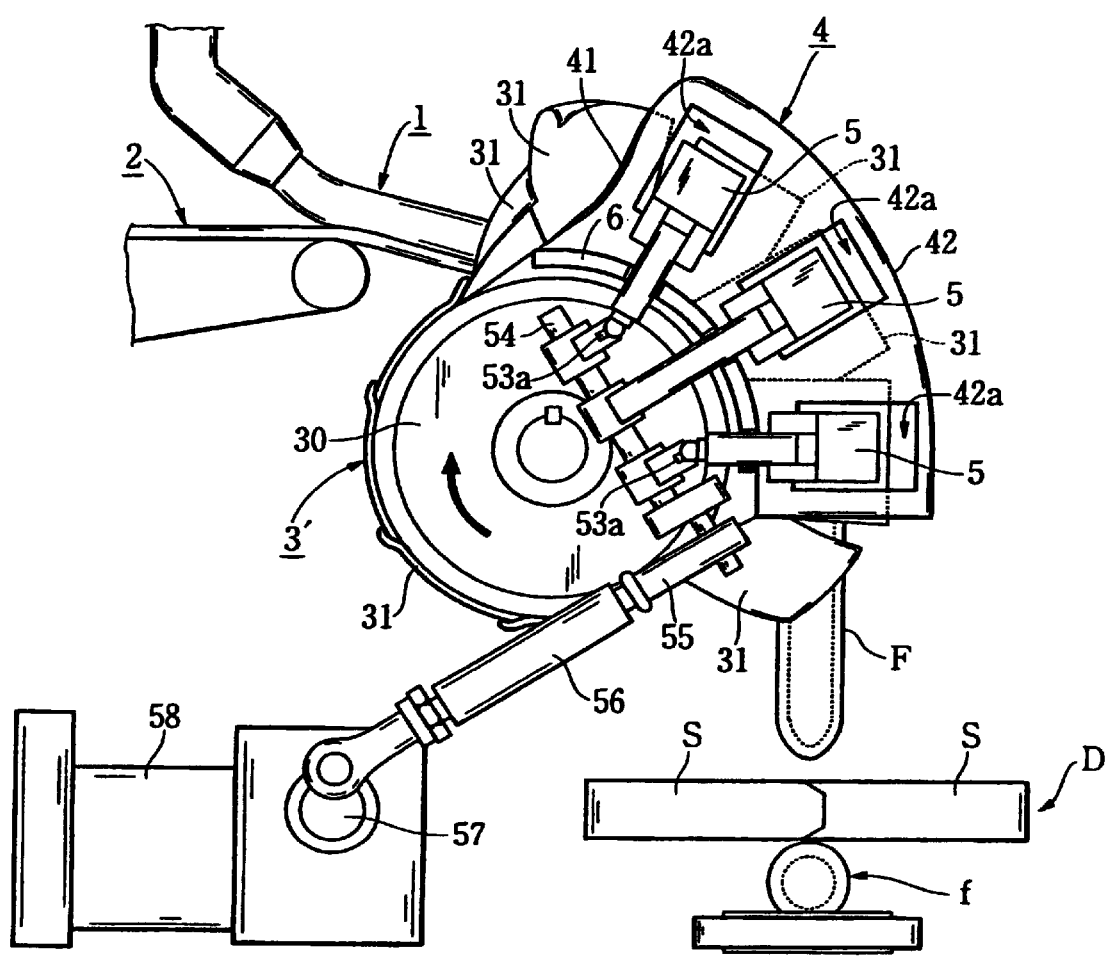
FIG. 15 is a schematic side elevation view of an apparatus in modification of the apparatus embodied in the present invention.

Also, in the present embodiment, the carriage conveyor (3) the belt portion of which comprises a number of belt pieces (31) each aligned in the moving direction of the conveyor and which is suspended between the plural number of pulleys is adopted, but the present invention is not limited to this embodiment. As shown in FIG. 15, it is possible to adopt a carriage conveyor (3') structured in such a manner that its belt portion comprising a number of belt pieces (31)•(31)•• aligned in the moving direction of the conveyor is mounted on a sole pulley (30) of large diameter. In this modified embodiment, a pair of guides (4) and a frame (6) are formed in an arc shape along the circumference of said pulley (30) wherein three compression molding members (5)•(5)•• are radially provided on the main body portion (42) of each guide (4) in such a manner that one molding member (5) at one side opposedly faces the corresponding member (5) at the other side so as to make three pairs of them on the conveyor (3'). What is indicated with a reference number (53a) in FIG. 15 is a ball joint to transmit the movement of the common revolving shaft (54) to the compression molding members (5) at both ends of said shaft in such a manner that those members can swing back and forth with regard to the conveyor. Not to change the subject, a housing for this modified apparatus is not illustrated in FIG. 15. With this modified apparatus, a cored food in a bar shape (F) produced thereby directly drops from the terminal end of the guides due to its self-weight, and a further streamlined structure can be realized.

As described above, with the apparatus embodied in the present invention, an outer skin material mounted on a number of the belt pieces arranged in the moving direction of the conveyor in such a manner that they are foldable towards the conveyor independently from each other is molded by bending said pieces with the guides so that it can make the belt transformation space far smaller in comparison with the prior arts. Furthermore, the outer skin material is intermittently compressed by means of the belt pieces with the compression molding members swinging back and forth with regard to the conveyor, so that it becomes possible to efficiently produce a cored food in a bar shape in space-saving manner as well as preventing the glutinous substance and granularity of a food material from being damaged.

What is claimed is:

1. A method of continuously producing a cored food in a bar shape made of at least two types of food materials and formed by covering an inner material with an outer skin material comprising the steps of:

mounting the outer skin material formed in flat shape on a carriage conveyor whose belt portion comprises a number of belt pieces having first and second ends aligned in a carriage course of the conveyor, wherein the belt pieces are foldable towards said conveyor independently from each other, and then placing said inner material upon said skin material;

bending said skin material mounted on said belt pieces in a gutter shape by raising both ends of each belt piece in operation along a pair of guides provided on first and second sides of said conveyor; and intermittently compressing the outer skin material bent into the gutter shape via the belt pieces with at least a pair of compression molding members provided on said first and second sides of said conveyor, wherein the compression molding members swing back and forth with respect to said carriage course, thereby, covering said inner material with the outer skin material, wherein a cored food in a bar shape is continuously produced.

2. A method of producing a cored food in a bar shape as claimed in claim 1, wherein the belt portion comprises belt pieces arranged so that a first belt piece partly overlaps a second belt piece located adjacent on the downstream side of the carriage conveyor.

3. A method of producing a cored food in a bar shape according to claim 1, wherein the belt pieces are arranged so that a central portion of each of the belt pieces is on a central portion of a lining belt.

4. A method of producing a cored food in a bar shape according to claim 2, wherein the belt pieces are arranged so that a central portion of each of the pieces is on a central portion of a lining belt.

5. A method of producing a cored food in a bar shape according to claim 1, wherein the outer skin material is mounted on the carriage conveyor, wherein the carriage conveyor is suspended on a single pulley, said conveyor having the belt portion comprising a number of the belt pieces.

6. A method of producing a cored food in a bar shape according to claim 2, wherein the outer skin material is mounted on the carriage conveyor, wherein the carriage conveyor is suspended on a single pulley, said conveyor having the belt portion comprising a number of the belt pieces.

7. A method of producing a cored food in a bar shape according to claim 3, wherein the outer skin material is mounted on the carriage conveyor, wherein the carriage conveyor is suspended on a single pulley, said conveyor having the belt portion comprising a number of the belt pieces.

8. A method of producing a cored food in a bar shape according to claim 4, wherein the outer skin material is mounted on the carriage conveyor, wherein the carriage conveyor is suspended on a single pulley, said conveyor having the belt portion comprising a number of the belt pieces.

9. A method of producing a cored food in a bar shape according to claim 1, wherein the outer skin material is made of one of steamed glutinous and nonglutinous rice extended in flat shape.

10. A method of producing a cored food in a bar shape according to claim 2, wherein the outer skin material is made of one of steamed glutinous and nonglutinous rice extended in flat shape.

11. A method of producing a cored food in a bar shape according to claim 3, wherein the outer skin material is made of one of steamed glutinous and nonglutinous rice extended in flat shape.

12. A method of producing a cored food in a bar shape according to claim 4, wherein the outer skin material is made of one of steamed glutinous and nonglutinous rice extended in flat shape.

13. A method of producing a cored food in a bar shape according to claim 5, wherein the outer skin material is made of one of steamed glutinous and nonglutinous rice extended in flat shape.

14. A method of producing a cored food in a bar shape according to claim 6, wherein the outer skin material is made of one of steamed glutinous and nonglutinous rice extended in flat shape.

15. A method of producing a cored food in a bar shape according to claim 7, wherein the outer skin material is made of one of steamed glutinous and nonglutinous rice extended in flat shape.

16. An apparatus for continuously producing a cored food in a bar shape made of at least two types of food materials and formed by covering an inner material with an outer skin material comprising;
- a carriage conveyor whose belt portion comprises a number of belt pieces aligned on the conveyor wherein they are foldable towards said conveyor independently from each other;
- a pair of guides provided on both sides of said conveyor which raise first and second ends of each belt piece in operation so as to bend said belt pieces into a gutter shape; and
- at least a pair of compression molding members each provided on both sides of said conveyor which swing back and forth with respect to a direction of conveyor travel,
- wherein during the travel on the conveyor of both the outer skin material in a flat shape and the inner material which is mounted on the skin material, and outer skin material is bent into the gutter shape by raising both ends of each belt piece along a pair of guides;
- wherein the gutter shape is intermittently compressed via the belt pieces with the compression molding members, and
- wherein said inner material is covered with the outer skin material so as to continuously produce a cored food in a bar shape.

17. An apparatus of producing a cored food in a bar shape as claimed in claim 16, wherein the belt pieces of the conveyor are arranged so that a first belt piece partly overlaps a second adjacent belt piece located on the downstream side of the carriage conveyor.

18. An apparatus of producing a cored food in a bar shape according to claim 16, wherein the belt pieces of the conveyor are arranged so that a central portion of each of them is on a central portion of a lining belt.

19. An apparatus of producing a cored food in a bar shape according to claim 17, wherein the belt pieces of the conveyor are arranged so that a central portion of each is on a central portion of a lining belt.

20. An apparatus of producing a cored food in a bar shape according to claim 16, wherein the carriage conveyor is arranged so that its belt portion comprising a number of the belt pieces aligned on the conveyor is suspended on a single pulley, and wherein a pair of the guides as well as the compression molding members are provided on the circumference of said pulley.

21. An apparatus of producing a cored food in a bar shape according to claim 17, wherein the carriage conveyor is arranged so that its belt portion comprising a number of the belt pieces aligned on the conveyor is suspended on a single pulley, and wherein a pair of the guides as well as the compression molding members are provided on the circumference of said pulley.

22. An apparatus of producing a cored food in a bar shape according to claim 18, wherein the carriage conveyor is arranged so that its belt portion comprising a number of the belt pieces aligned on the conveyor is suspended on a single pulley, and wherein a pair of the guides as well as the compression molding members are provided on the circumference of said pulley.

23. An apparatus of producing a cored food in a bar shape as claimed in claim 19, wherein the carriage conveyor is arranged so that its belt portion comprising a number of the belt pieces aligned on the conveyor is suspended on a single pulley, and wherein a pair of the guides as well as the compression molding members are provided on the circumference of said pulley.

* * * * *